United States Patent
Andrzejewski et al.

(10) Patent No.: US 11,719,292 B2
(45) Date of Patent: *Aug. 8, 2023

(54) STRUT CLUTCH ASSEMBLY TORQUE LOCKING MECHANISM, AND CLUTCH STRUT

(71) Applicant: Means Industries, Inc., Saginaw, MI (US)

(72) Inventors: Todd Andrzejewski, Saginaw, MI (US); David Hacker, Bad Axe, MI (US); Kelly J. Campfield, Pinconning, MI (US)

(73) Assignee: MEANS INDUSTRIES, INC., Saginaw, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/576,148

(22) Filed: Jan. 14, 2022

(65) Prior Publication Data

US 2022/0235831 A1 Jul. 28, 2022

Related U.S. Application Data

(60) Provisional application No. 63/140,332, filed on Jan. 22, 2021.

(51) Int. Cl.
 *F16D 41/12* (2006.01)
 *F16D 27/108* (2006.01)

(52) U.S. Cl.
 CPC ......... *F16D 41/125* (2013.01); *F16D 27/108* (2013.01)

(58) Field of Classification Search
 CPC ........ F16D 41/125; F16D 41/16; F16D 41/12; F16D 27/108
 See application file for complete search history.

(56) References Cited

U.S. PATENT DOCUMENTS

| 9,127,724 | B2 | 9/2015 | Kimes et al. | |
|---|---|---|---|---|
| 9,638,266 | B2 | 5/2017 | Kimes | |
| 2014/0284167 | A1* | 9/2014 | Kimes | F16D 27/09 |
| | | | | 192/84.92 |
| 2016/0375754 | A1* | 12/2016 | Kurosaki | F16H 3/728 |
| | | | | 475/5 |
| 2017/0002877 | A1 | 1/2017 | Shioiri et al. | |
| 2017/0097055 | A1 | 4/2017 | Shibata et al. | |
| 2018/0087585 | A1* | 3/2018 | Hand | F16D 41/14 |
| 2018/0266503 | A1 | 9/2018 | Shioiri et al. | |
| 2018/0328419 | A1* | 11/2018 | Hand | F16D 41/14 |
| 2019/0293131 | A1 | 9/2019 | Campton et al. | |
| 2022/0252112 | A1 | 8/2022 | Andrzejwski | |

* cited by examiner

*Primary Examiner* — Timothy Hannon
(74) *Attorney, Agent, or Firm* — Reising Ethington P.C.

(57) ABSTRACT

A clutch assembly includes a pocket plate having a pocket and a teeter-totter strut retained in the pocket. The teeter-totter strut is pivotable to an engaged position in which an engagement face of the teeter-totter strut extends out from the pocket plate. The teeter-totter strut is pivotable from the engaged position to a disengaged position in which the engagement face of the teeter-totter strut does not extend out from the pocket plate. The clutch assembly is configured so that when a shock load force acts on the teeter-totter strut, the teeter-totter strut is prevented from moving into the engaged position.

16 Claims, 7 Drawing Sheets

STRUT CLUTCH ASSEMBLY TORQUE LOCKING MECHANISM, AND CLUTCH STRUT

TECHNICAL FIELD

The present disclosure relates to clutch assemblies and, more particularly, to clutch assemblies having teeter-totter struts.

BACKGROUND

Unintended deployment of locking members employed in clutch assemblies due to shock load is problematic because a shock load force may cause the locking members to be deployed and/or engaged, and may cause undesirable operation and/or damage to the clutch assembly. In some clutch assemblies, a solenoid may include a plunger that acts on a strut for purposes of engaging the strut, and in other clutch assemblies the strut operates independently of a solenoid. In either case, if a solenoid spring fails and a shock load occurs, the plunger is free to move thus resulting in unintended deployment of the strut. In another example of unintended deployment, if a strut spring fails, then the strut can freely move toward an engagement face during a shock load. As will be discussed in detail below, the inventors developed designs to prevent such unintended deployment of struts.

SUMMARY

A clutch assembly includes a pocket plate having a pocket and a teeter-totter strut retained in the pocket. The teeter-totter strut is pivotable to an engaged position in which an engagement face of the teeter-totter strut extends out from the pocket. The teeter-totter strut is pivotable from the engaged position to a disengaged position in which the engagement face of the teeter-totter strut extends within the pocket. The clutch assembly is configured so that when a shock load force acts on the teeter-totter strut, the teeter-totter strut is prevented from moving into the engaged position.

A clutch assembly includes an electromechanical component having an actuator and a pocket plate having a pocket with a pivotable teeter-totter strut therein. The teeter-totter strut, in response to the actuator acting on the teeter-totter strut, pivots to an engaged position in which an engagement face of the teeter-totter strut extends out from the pocket plate. The teeter-totter strut, in response to an absence of the actuator acting on the teeter-totter strut, pivots from the engaged position to a disengaged position in which the engagement face of the teeter-totter strut does not extend out from the pocket plate. The teeter-totter strut is configured so that, when a shock load force acts on the teeter-totter strut, the teeter-totter strut prevents movement into the engaged position.

A torque locking mechanism for preventing back driving of a rotary stage including a notch plate configured for rotation about a rotational axis includes a coupling face of the notch plate oriented to face axially along the axis and having a set of locking formations angularly spaced about the axis. Each of the locking formations defines a load-bearing surface adapted for abutting engagement with a load-bearing surface of a teeter-totter strut. The torque locking mechanism further includes (i) a pocket plate having the teeter-totter strut and (ii) an electromechanical component having an actuator. The teeter-totter strut is moveable towards the coupling face to a locked position in response to the actuator acting on the teeter-totter strut. The teeter-totter strut abuttingly engages one of the locking formations to prevent rotation of the notch plate in one direction about the rotational axis in the locked position. At least one of the pocket of the pocket plate or the teeter-totter strut is configured so that when a shock load force acts on the teeter-totter strut, the teeter-totter strut is prevented from moving into the engaged position. While the rotary stage is rotating, the teeter-totter strut is in an unlocked position and after the rotary stage ceases rotating, the teeter-totter strut moves into the locked position to prevent the rotary stage from back driving.

DETAILED DESCRIPTION

Detailed embodiments of the present disclosure are disclosed herein; however, it is to be understood that the detailed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The teachings herein provide a torque lock mechanism for an electromechanical system. The electromechanical system may be used in vehicular and non-vehicular applications to slow, stop, and/or prevent movement of a moving component.

The torque lock mechanism is a clutch assembly having a normally off teeter-totter strut that is actuated by an actuator. In accordance with embodiments of the present disclosure, the teeter-totter strut has enhanced features for preventing its unintended deployment due to shock load. Other types of clutch assemblies which may have teeter-totter struts having such enhanced features include dynamic controllable clutches (DCC), mechanical diode (MD) one-way clutches, and controllable mechanical diode (CMD) two-way clutches.

Figure 1:
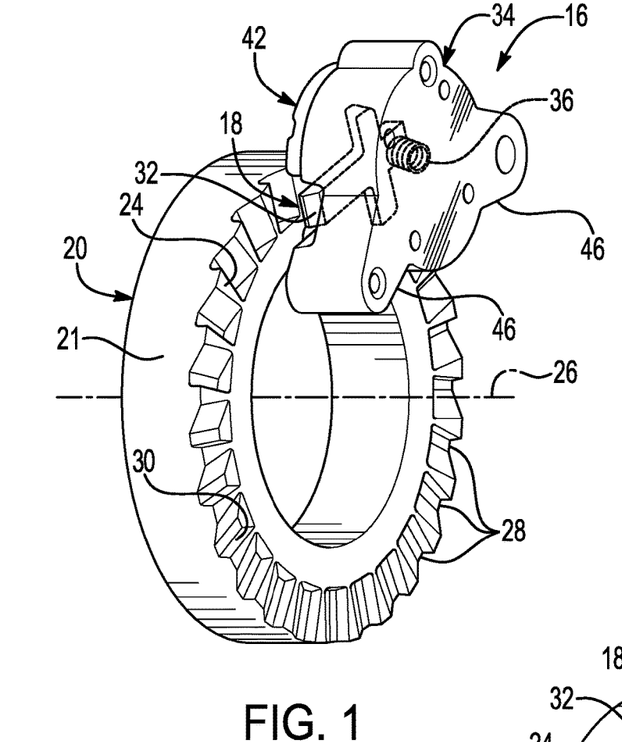
FIG. 1 is a perspective schematic view of various components of a torque locking mechanism or assembly including a locking member in its retracted, unlocked position.
Figure 2:
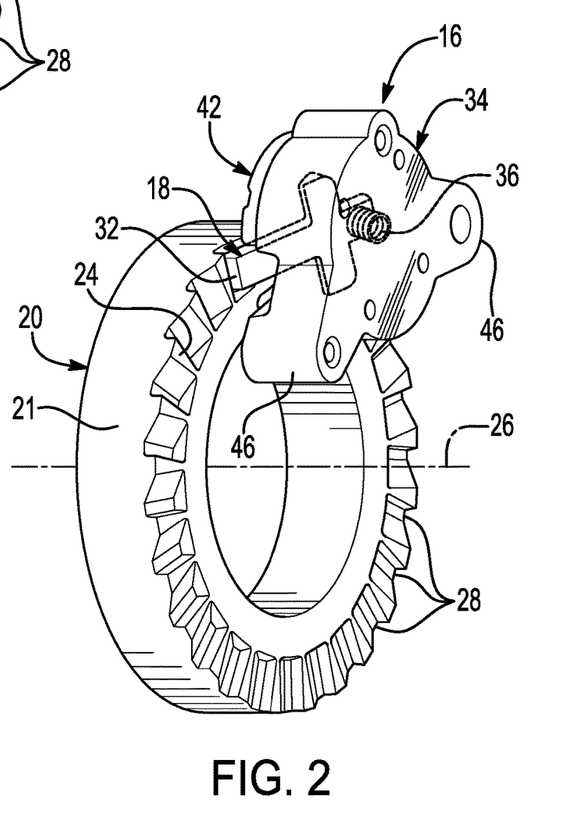
FIG. 2 is a perspective schematic view of the various components of the torque locking mechanism or assembly but with the locking member in its engaged, locked position.
Figure 3:
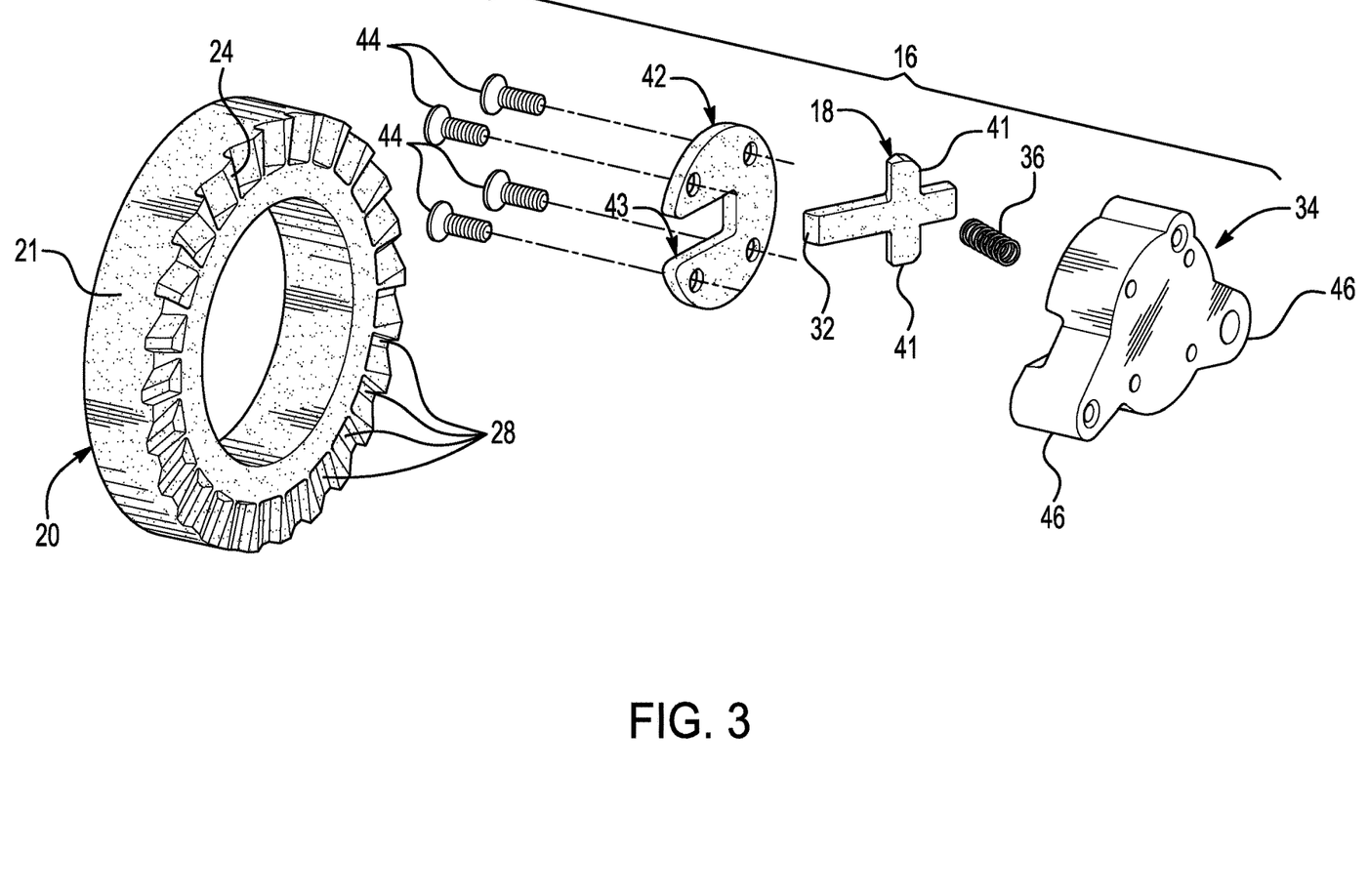
FIG. 3 is an exploded perspective view of the various components of the torque locking mechanism or assembly.
Figure 4:
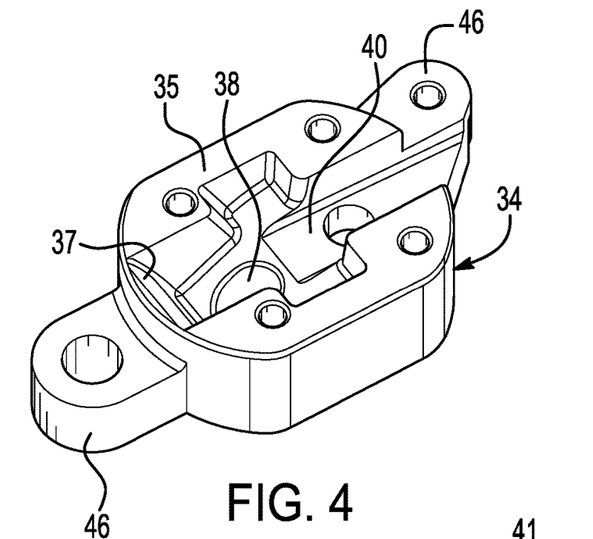
FIG. 4 is an enlarged, perspective, schematic view of a pocket plate or coupling member of the torque locking mechanism or assembly.
Figure 5:
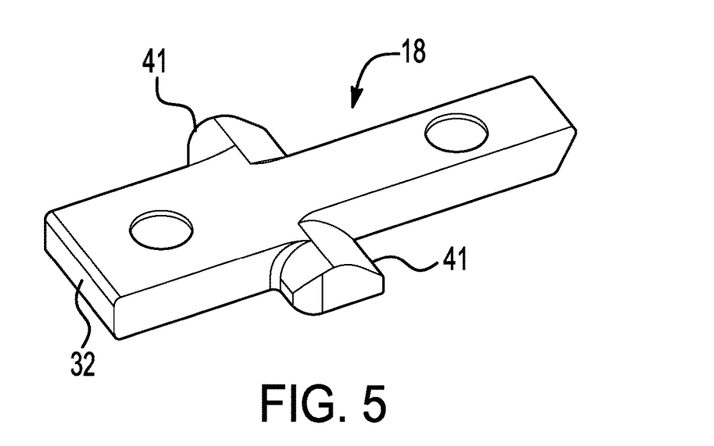
FIG. 5 is an enlarged, perspective, schematic view of a teeter-totter strut or locking member of the torque locking mechanism or assembly.
Figure 6:
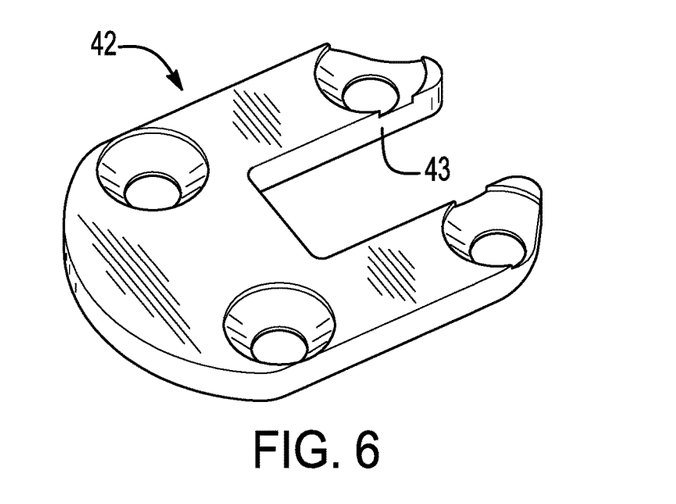
FIG. 6 is an enlarged, perspective, schematic view of a retainer or cover plate of the torque locking mechanism or assembly.
Figure 7:
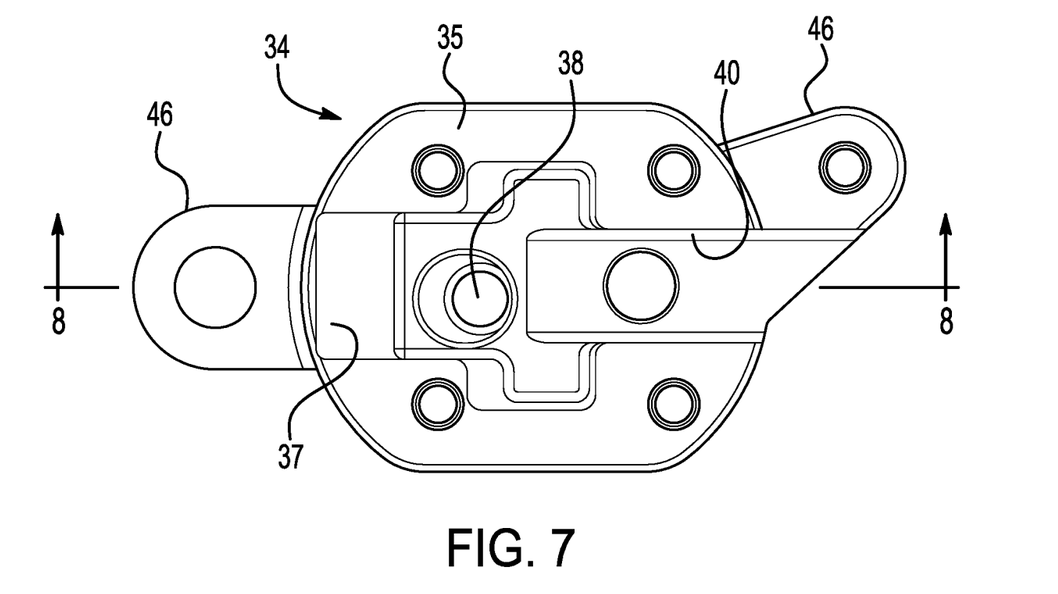
FIG. 7 is a top plan view of the pocket plate or coupling member.
Figure 8:
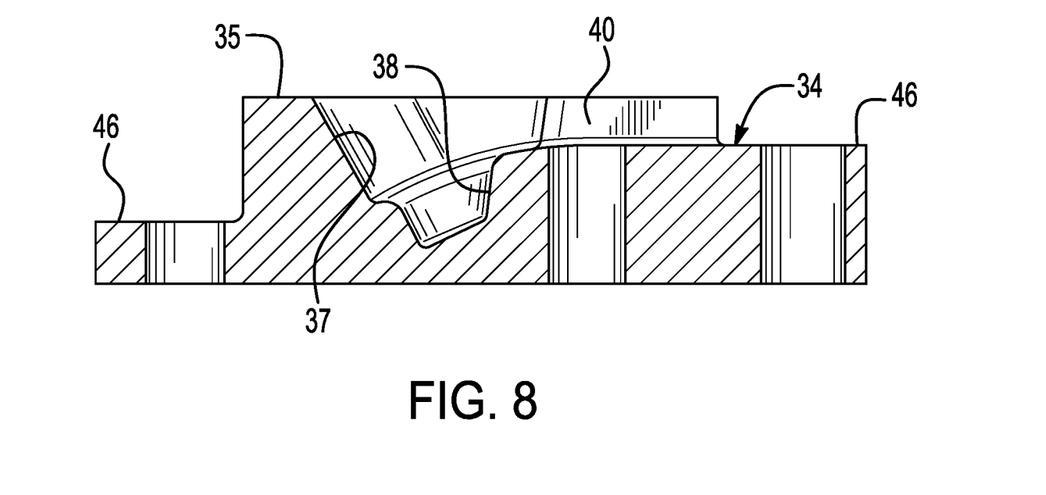
FIG. 8 is a sectional view taken along lines 8-8 of FIG. 7 of the pocket plate or coupling member.
Figure 9:
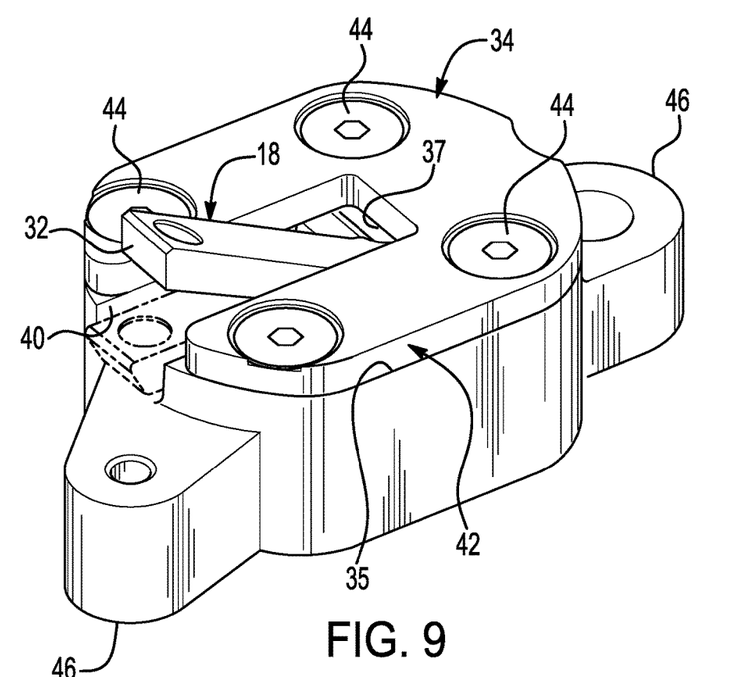
FIG. 9 is an enlarged, perspective, schematic view of a subassembly including the pocket plate or coupling member, the strut or locking member (in its active and inactive states), the cover or retainer plate, and the threaded fasteners which hold the subassembly together.

Referring now to FIGS. 1 and 2, there are illustrated various components of a torque locking mechanism 16 including a locking member or teeter-totter strut ("strut") 18 in its retracted, unlocked position and its engaged, locked position, respectively. The strut 18 is also shown in its retracted position in FIG. 10 and in its engaged position in FIG. 11. The strut 18 is shown in both of its positions in FIG. 9.

Referring now to FIGS. 1-3 and 10-11, the torque locking mechanism 16 includes at least a portion of a notch plate 20. The notch plate 20 is configured for rotation about a rotational axis 26. The notch plate 20 has a face 21 oriented to face radially with respect to the rotational axis 26. The notch plate 20, for instance, is a component of a rotary stage of an electromechanical system.

The portion of the notch plate 20 which forms part of the torque locking mechanism 16 comprises a coupling face 24 which faces axially along the rotational axis 26. The coupling face 24 has a set of locking formations in the form of notches 28 which form a notch profile in the notch plate 20. The notches 28 are angularly spaced about the rotational axis 26. Each notch 28 defines a load-bearing surface 30 (labeled in FIGS. 10 and 11) adapted for abutting engagement with a load-bearing surface 32 of the strut 18.

Referring to FIGS. 1-4 and 7-11, there is illustrated a coupling member in the form of a pocket plate, generally indicated at 34, which serves as a housing for the strut 18. The pocket plate 34 has a coupling face 35 with a pocket 40 which defines a load bearing shoulder 37. The strut 18 is biased by a return spring 36 disposed within a spring pocket 38 within the larger pocket 40 towards its unlocked position (shown in FIGS. 1 and 10).

The strut 18 pivotally moves within its pocket 40 and is retained therein by a cover or retainer plate, generally indicated at 42. The cover plate 42 is secured to the pocket plate 34 by a plurality of threaded fasteners such as bolts or screws 44 which extend through holes in the cover plate 42 and into the pocket plate 34. The cover plate 42 includes a relief or slit 43 which allows the strut 18 to extend therethrough. The strut 18 further includes ears or wings 41 that prevent the strut 18 from completely leaving its pocket 40.

The pocket plate 34 is secured to a housing 45 of an electromechanical component such as a solenoid, generally indicated at 47, via apertured attachment flanges 46 of the pocket plate 34 and apertured attachment flanges of the housing 45. Threaded fasteners (not shown) fasten the solenoid 47 to the pocket plate 34.

Figure 10:
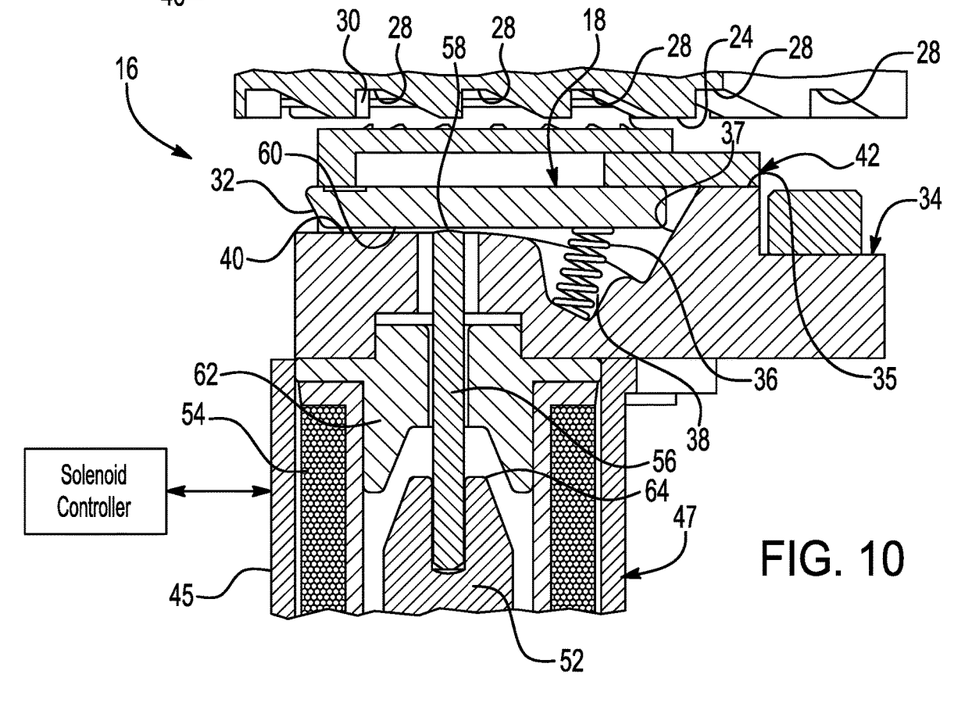
FIG. 10 is a view, partially broken away and in cross-section, of the torque locking mechanism or assembly in its inactive or unlocked position.
Figure 11:
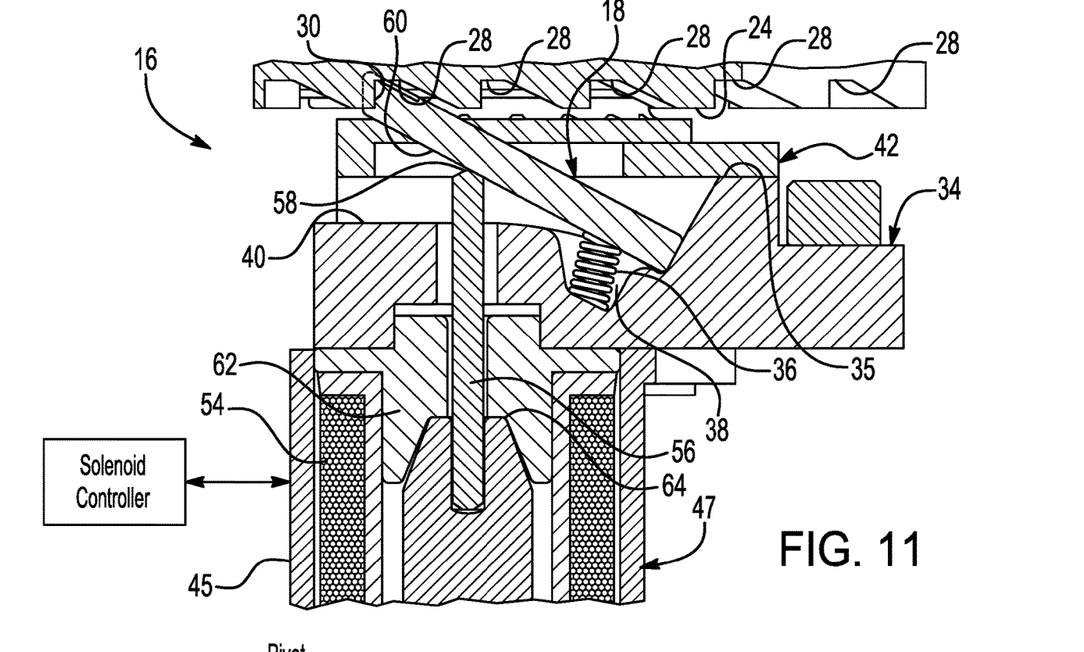
FIG. 11 is a view, partially broken away and in cross-section, of the torque locking mechanism or assembly in its active or locked position.

The solenoid 47 includes an armature 52 (shown in FIGS. 10-11) and an excitation coil 54 which, when energized, causes an actuator in the form of a push pin 56 (i.e., a type of actuator) to linearly move with the armature 52 (the pin 56 being mounted for movement at one end of the armature 52) from its position shown in FIG. 10 to its position shown in FIG. 11. Because a distal end 58 of the pin 56 is in close proximity to a lower surface 60 of the strut 18 as shown in FIG. 10, translational movement of the pin 58 upward to its uppermost position (shown in FIG. 11), causes the strut 18 to pivot upwardly in its pocket 40 against the biasing action of its strut return spring 36. When the excitation coil 54 is de-energized, the armature 52 and its pin 56 move downwardly via the biasing action of a solenoid spring (not shown) which extends between an end part 62 of the solenoid 47 and a distal end 64 of the armature 52.

As described above, the electromechanical component or solenoid 47 forms part of the torque locking mechanism 16. The solenoid 47 is normally off (i.e., the coil 54 is de-energized). The coil 54 is then energized and the pin 56 moves the strut 18 into one of the notches 28 in the notch profile in the notch plate 20. The rotary stage is then released, and torque is applied to the strut 18 thereby locking the notch plate 20 from rotating in one direction about the rotational axis 26. Electrical current is then removed from the coil 54 since the strut 18 is held in its extended, locked position by torque.

Teeter-Totter Single Strut Insert (SSI) with Shock Load Engagement Prevention

The locking member or teeter-totter strut ("strut") 18 has enhanced features for preventing unintended deployment of the strut 18 due to shock load. As described, the strut 18 is utilized in an electromechanical system utilizing a normally off solenoid 47 with return spring, the pocket plate 34, the strut return spring 36, and the cover plate 42. The system is designed for the push pin 56 to push directly on the strut 18 during engagement. When the system is disengaged, the strut 18 is returned to the "off" position via the strut return spring 36, and the solenoid 47 is returned via an internal solenoid spring.

One consideration when working with an electromechanical system is the implications which a shock load or G-forces can have on the system. A shock load is the force on an object when the object suddenly accelerates or decelerates. In the case of a vehicle when the vehicle goes over a bump, glances off a curb, or is in a collision, a shock load is witnessed by most if not all components in a vehicle. When such an event occurs, the strut 18 in the case of a normally off with solenoid deployment may engage due to this load.

The strut 18 in accordance with embodiments of the present disclosure has enhanced features for preventing unintended deployment of the strut 18 due to shock load. Such enhanced features will be described with reference to FIGS. 12-15. In general, by utilizing the center of mass (CoM) (or center of gravity (CoG)) of the strut 18 and pivot points, the motion of the strut 18 can be arrested preventing deployment.

Figure 12:
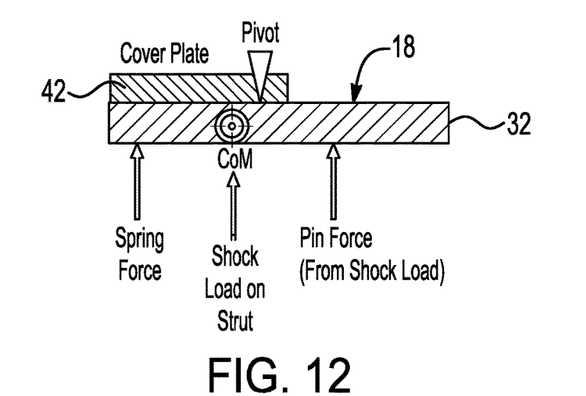
FIG. 12 is a schematic view of a shock load applied upward to a locking member in the form of a teeter-totter strut having enhanced features for preventing unintended deployment of the strut due to shock load.

FIG. 12 is a schematic view of a shock load applied upward (i.e., in the direction of engagement of the engagement face) to the strut 18 having the enhanced features for preventing unintended deployment of the strut 18 due to shock load. For purposes of this description, shock loads are in and out of plane with the strut 18 as shown FIGS. 12 and 13. With a conventional teeter-totter strut geometry, the CoM is slightly forward of the pivot point (i.e., toward the strut engagement face). This causes the strut to want to tip up or engage. When a strut unintendedly engages, the event may be damaging. In order to prevent the tendency for the strut 18 to want to engage, the CoM has been moved through geometry changes to behind the pivot point, or towards the location of the strut return spring 36. By moving the CoM, the moment at the pivot point yields a negative value, meaning the tip of the strut 18 will tend to rotate away from engagement.

If, during the shock load event, the solenoid pin 56 were able to move and contact the strut 18, then this configuration could prevent the pin 56 from being able to move the strut 18 according to the following equations:

$$\Sigma M \leq 0$$

$$\Sigma M = ((F_{SP} * -D_{SP\ to\ Pivot}) + (G_{Force} * M_{ST} * -D_{CoM\ to\ Pivot})) + (G_{Force} * M_{Pin} * D_{Pivot\ to\ Pin})$$

where $F_{SP}$ is the spring force, $D_{SP\ to\ Pivot}$ is the distance from the spring force to the pivot point, $G_{Force}$ is the impact load in Gs, $M_{ST}$ is the mass of the strut, $D_{CoM\ to\ Pivot}$ is the distance from the CoM of the strut to the pivot point, $M_{Pin}$ is the mass of the pin, and $D_{Pivot\ to\ Pin}$ is the distance from the pivot point to the pin contact point on the strut.

Figure 13:
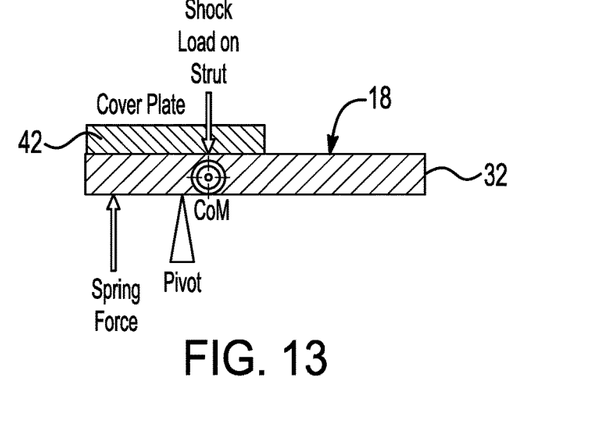
FIG. 13 is a schematic view of a shock load applied downward to the teeter-totter strut having enhanced features for preventing unintended deployment of the strut due to shock load.

FIG. 13 is a schematic view of a shock load applied downward (i.e., in the direction of disengagement of the engagement face) to the strut 18 having the enhanced features for preventing unintended deployment of the strut 18 due to shock load. With the configuration of a teeter-totter strut, a downward force relative to the pivot point in the bottom of the pocket can cause the strut to attempt to engage. To ensure that the strut 18 will not engage, the pivot point in the bottom of the pocket is located to the left (toward the return spring 36) of the CoM of the strut. This again results in a negative moment about the pivot point thus causing the tip of the strut 18 to want to move away from the engagement.

The following equations are applicable with respect to the enhanced design features that are the subject of FIG. 13:

$$\Sigma M \leq 0$$

$$\Sigma M = ((F_{SP} * -D_{SP\ to\ Pivot}) + (-G_{Force} * M_{ST} * -D_{CoM\ to\ Pivot}))$$

where $F_{SP}$ is the spring force, $D_{SP\ to\ Pivot}$ is the distance from the spring force to the pivot point, $G_{Force}$ is the impact load in Gs, $M_{ST}$ is the mass of the strut, and $D_{CoM\ to\ Pivot}$ is the distance from the CoM of the strut to the pivot point.

In order to adjust the CoM of the strut 18 there are several geometric changes which can be made. These include, but are not limited to, lengthening, widening, and/or thickening the strut 18. The mentioned changes would take place on the side of the ears of the strut 18 which contact the strut return spring 36. In contrast to this, the opposite changes can be made to the side of the strut 18 which contacts the solenoid pin 56 and have the same result (shortening, narrowing, and/or thinning the strut). In addition, strut pocket geometry can utilize features such as bumps in the pocket 40 and tapered pocket bottoms to create a pivot for downward shock loads. For upward shock loads, the ears of the strut 18 are used as a pivot point.

The enhanced features of the strut 18 (i.e., "single strut insert (SSI) with shock-load prevention") in accordance with embodiments of the present disclosure for preventing unintended deployment of the strut 18 due to shock load are further described as follows. A primary idea of the enhanced features is to design the SSI such that during a shock load in either of the axial directions (+/−) the strut 18 will be unable to deploy based on physics. In this regard, a first sub-idea is to place the center of gravity (CoM) of the strut 18 behind the pivot pin (toward the strut return spring) for a shock load toward the notch engagement surface. A second sub-idea is to alter the pocket geometry such that the CoM of the strut 18 acts on an inclined surface forcing it down in the pocket for a shock load away from the notch engagement surface.

Figure 14:
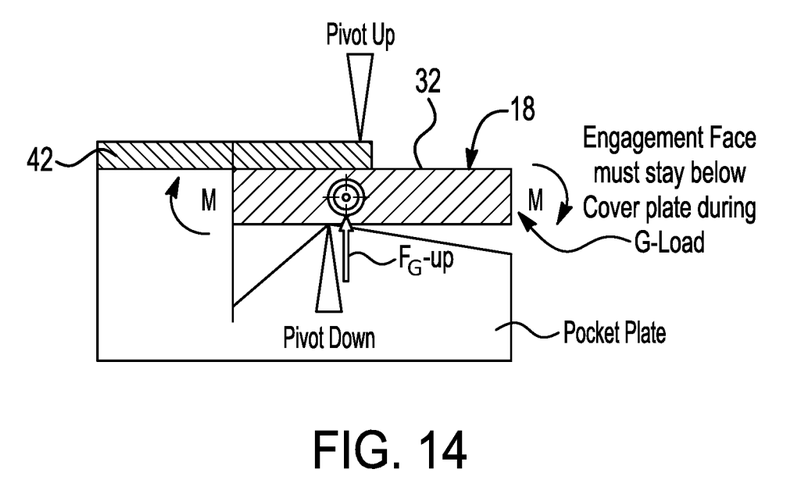
FIG. 14 is a schematic view of a shock load applied upward to the teeter-totter strut having enhanced features for preventing unintended deployment of the strut due to shock load.

$1^{st}$ Sub-Idea: CoM of Strut. FIG. 14 is in relation to the first sub-idea. With the CoM positioned toward the strut return spring, the moments are additive. Through a moment balance, if M is greater than 0, then the tendency of the strut 18 is to remain in the retracted position. By positioning the CoM, increasing mass of the strut, and appropriate spring force, the strut 18 can withstand the shock-load if the solenoid return spring were to fail.

Benefits of the first sub-idea may include the following. Reduces the occurrence/detection in the design failure mode and effect analysis (DFMEA). With a severity of ten, reduction of occurrence and detection is desired to lower the risk priority number (RPN). Yields a physics-based solution which can be tested physically and through computer-aided engineering (CAE) to prove the validity of the design. Reduces the spring force in the solenoid and the strut return spring. Depending on force balance the solenoid spring may be reduced because the retention of the solenoid pin is not critical to prevention of deployment. The strut return spring can be reduced if solenoid spring is maintained, this results in less force needed from the solenoid.

Figure 15:
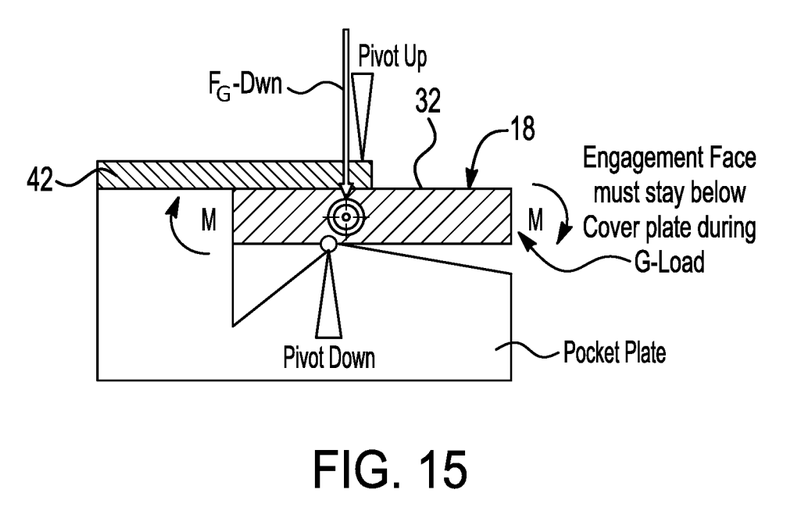
FIG. 15 is a schematic view of a shock load applied downward to the teeter-totter strut having enhanced features for preventing unintended deployment of the strut due to shock load.

$2^{nd}$ Sub-Idea: Strut Pocket Geometry. FIG. 15 is in relation to the second sub-idea. The strut pocket is recessed (away from the strut return spring). The angled surface is to exist from behind the CoM—an alternative is to have a bump behind the CoM (small circle). When a downward G-force is exerted the force acts at the CoM, thus due to the angle or bump the tendency is for the portion of the strut 18 to the right of the pivot point will continue to move downward in the retracted position. The pivot moves from strut ears to the point of recess or bump. The CoM is placed in front of the pivot.

Benefits of the second sub-idea may include the following. Reduce the occurrence/detection in the DFMEA. With a severity of ten, reduction of occurrence and detection is desired to lower the RPN. Yields a physics-based solution which can be easily analyzed and drive down DFMEA values. Reduce the spring force in the solenoid and the strut return spring. Depending on force balance the solenoid spring could be reduced because the retention of the solenoid pin is not critical to prevention of deployment. The strut return spring can be reduced if the solenoid spring is maintained, this results in less force needed from the solenoid.

In sum, the first and second sub-ideas incorporate a physics-based solution to G-loading into the SSI. Through positioning of the CoM of the strut and utilizing pocket geometry to change the pivot point based on direction of impact, the effects of G-loading can be eliminated regarding strut deployment. During a +G-load (direction of strut deployment) the CoM is positioned toward the return spring, behind the pivot, to cause additional retraction forces in conjunction with the return spring. During a −G-load (direction of strut disengagement) a bump or recess in the pocket is to be added to promote the tip of the strut to move toward a farther disengaged position. Due to the position of the CoM to the original pivot location, a −G-load would result in strut deployment if the return spring is compromised or incorrectly specified. By adding the recess to the pocket or the bump, the pivot point is moved, and the strut tends to stay in the retracted position.

The enhanced features of the strut 18 are applicable to any other teeter-totter strut having a normally off position that is actuated by some type of actuator. For exemplary purposes, the actuator described herein is the pin 56 of the solenoid 47. However, the teeter-totter strut 18 with the enhanced design features for preventing unintended deployment of the strut due to shock load may be utilized in other assemblies such as dynamic controllable clutches (DCC), mechanical diode (MD) one-way clutches, and controllable mechanical diode (CMD) two-way clutches having actuators for actuating struts retained in pocket plates. The package simply has to have the ability to shift the CoM toward the strut spring, along with having the ability to axially fit a bump or recessed strut tip into the pocket, as described herein.

As described, a consideration when working with an electromechanical system is the implications which a shock load or G-forces can have on the system. The enhanced design features of the strut 18 use two methods to prevent unintended engagement based on geometry and physics. The first method utilizes center of mass (CoM) to prevent unintended engagement of the strut 18 under shock loading. The CoM of the strut 18 is positioned such that it is biased toward the spring side of the strut behind the pivot line. With the CoM being biased in this direction, during a shock load the force acts at the CoM, thus resulting in a retraction force rather than extension. The second method utilizes moment arms to prevent engagement during solenoid spring failure. The strut spring and geometry are utilized to prevent unintended engagement in the event that the solenoid spring fails to maintain the armature position. The mass of the pushpin armature and force application location are such that the strut return spring force and CoM combine to resist the impact from the pushpin assembly.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

What is claimed is:

1. A clutch assembly comprising:
   a pocket plate having a pocket;
   a teeter-totter strut retained in the pocket, the teeter-totter strut being pivotable to an engaged position in which and engagement face of the teeter-totter strut extends out from the pocket, the teeter-totter strut being pivotable from the engaged position to a disengaged position in which the engagement face of the teeter-totter strut extends within the pocket; and
   wherein the clutch assembly is configured so that when a shock load force acts on the teeter-totter strut, the teeter-totter strut is prevented from moving into the engaged position,
   wherein the clutch assembly includes a first pivot point acting on a first face of the teeter-totter strut and a second pivot point acting on a second face of the teeter-totter strut, wherein a center of mass of the teeter-totter strut is positioned between the first pivot point and the second pivot point.

2. The clutch assembly of claim 1, wherein the teeter-totter strut is configured so that, when the shock load force acts on the second face of the teeter-totter strut, the teeter-totter strut is forced about the first pivot point into the disengaged position.

3. The clutch assembly of claim 2, wherein the teeter-totter strut is configured so that, when the shock load force acts on the first face of the teeter-totter strut, the teeter-totter strut is forced about the second pivot point into the disengaged position.

4. The clutch assembly of claim 1, further comprising a return spring that is retained in a spring pocket and that provides a biasing force between the spring pocket and the second face of the teeter-totter strut, and wherein the center of mass of the teeter-totter strut is between a point at which the return spring contacts the second face of the teeter-totter strut and the first pivot point.

5. The clutch assembly of claim 4, wherein the first pivot point is located between the center of mass and a point at which an actuator acts on the second face of the teeter-totter strut.

6. The clutch assembly of claim 4, wherein the second pivot point is located between the center of mass and the point at which the return spring contacts the second face of the teeter-totter strut.

7. A clutch assembly comprising:
   a pocket plate having a pocket;
   a teeter-totter strut retained in the pocket, the teeter-totter strut being pivotable to an engaged position in which and engagement face of the teeter-totter strut extends out from the pocket, the teeter-totter strut being pivotable from the engaged position to a disengaged position in which the engagement face of the teeter-totter strut extends within the pocket; and
   wherein the clutch assembly is configured so that when a shock load force acts on the teeter-totter strut, the teeter-totter strut is prevented from moving into the engaged position,
   wherein the clutch assembly includes a first pivot point acting on a first face of the teeter-totter strut, and wherein the clutch assembly is configured so that, when the shock load force acts on a second face of the teeter-totter strut, the teeter-totter strut is forced about the first pivot point into the disengaged position.

8. A clutch assembly comprising:
   a pocket plate having a pocket;
   a teeter-totter strut retained in the pocket, the teeter-totter strut being pivotable to an engaged position in which and engagement face of the teeter-totter strut extends out from the pocket, the teeter-totter strut being pivotable from the engaged position to a disengaged position in which the engagement face of the teeter-totter strut extends within the pocket, and wherein the clutch assembly is configured so that when a shock load force acts on the teeter-totter strut, the teeter-totter strut is prevented from moving into the engaged position, wherein a first pivot point is located between a center of mass of the teeter-totter strut and either
- a point at which an actuator acts on the teeter-totter strut or
- a point at which a return spring contacts a first face of the teeter-totter strut.

9. The clutch assembly of claim 8, wherein the teeter-totter strut pivots to the engaged position in response to the actuator acting on the teeter-totter strut, and in response to an absence of the actuator acting on the teeter-totter strut pivots to the disengaged position.

10. A clutch assembly comprising:
an electromechanical component having an actuator;
a pocket plate having a pocket with a pivotable teeter-totter strut therein, the teeter-totter strut, in response to the actuator acting on the teeter-totter strut, pivots to an engaged position in which an engagement face of the teeter-totter strut extends out from the pocket plate, the teeter-totter strut in response to an absence of the actuator acting on the teeter-totter strut pivots from the engaged position to a disengaged position in which the engagement face of the teeter-totter strut does not extend out from the pocket plate; and
wherein at least one of the pocket of the pocket plate of the teeter-totter strut is configured so that when a shock load force acts on the teeter-totter strut, the teeter-totter strut is prevented from moving into the engaged position,
wherein the clutch assembly includes a first pivot point acting on a first face of the teeter-totter strut, and wherein the clutch assembly is configured so that, when the shock load force acts on a second face of the teeter-totter strut, the teeter-totter strut is forced about the first pivot point into the disengaged position.

11. A clutch assembly comprising:
an electromechanical component having an actuator;
a pocket plate having a pocket with a pivotable teeter-totter strut therein, the teeter-totter strut, in response to the actuator acting on the teeter-totter strut, pivots to an engaged position in which an engagement face of the teeter-totter strut extends out from the pocket plate, the teeter-totter strut, in response to an absence of the actuator acting on the teeter-totter strut, pivots from the engaged position to a disengaged position in which the engagement face of the teeter-totter strut does not extend out from the pocket plate; and
wherein at least one of the pocket of the pocket plate of the teeter-totter strut is configured so that when a shock load force acts on the teeter-totter strut, the teeter-totter strut is prevented from moving into the engaged position,
wherein a first pivot point is located between a center of mass of the teeter-totter strut and either
- a point at which the actuator acts on the teeter-totter strut or
- a point at which a return spring contacts a first face of the teeter-totter strut.

12. A torque locking mechanism for preventing back driving of a rotary stage including a notch plate configured for rotation about a rotational axis, the torque lock mechanism comprising,
a pocket plate having a pocket receiving a teeter-totter strut;
an electromechanical component having an actuator,
a coupling face of the notch plate oriented to face axially along the rotational axis and having a set of locking formations angularly spaced about the rotational axis, each of the locking formations defining a load bearing surface adapted for abutting engagement with a load bearing surface of the teeter-totter strut;
wherein the teeter-totter strut is moveable towards the coupling face to a locked position in response to the actuator acting on the teeter-totter strut, the teeter-totter strut abuttingly engaging one of the locking formations to prevent rotation of the notch plate in one direction about the rotational axis in the locked position, wherein at least one of the pocket of the pocket plate or the teeter-totter strut being configured so that when a shock load force acts on the teeter-totter strut, the teeter-totter strut is prevented from moving into the engaged position; and
while the rotary stage is rotating, the teeter-totter strut is in an unlocked position and after the rotary stage ceases rotating, the teeter-totter strut moves into the locked position to prevent the rotary stage from back driving,
wherein the clutch assembly includes a first pivot point acting on a first face of the teeter-totter strut and a second pivot point acting on a second face of the teeter-totter strut, wherein a center of mass of the teeter-totter strut is positioned between the first pivot point and the second pivot point.

13. A torque locking mechanism for preventing back driving of a rotary stage including a notch plate configured for rotation about a rotational axis, the torque lock mechanism comprising:
a pocket plate having a pocket receiving a teeter-totter strut;
an electromechanical component having an actuator,
a coupling face of the notch plate oriented to face axially along the rotational axis and having a set of locking formations angularly spaced about the rotational axis, each of the locking formations defining a load bearing surface adapted for abutting engagement with a load bearing surface of the teeter-totter strut;
wherein the teeter-totter strut is moveable towards the coupling face to a locked position in response to the actuator acting on the teeter-totter strut, the teeter-totter strut abuttingly engaging one of the locking formations to prevent rotation of the notch plate in one direction about the rotational axis in the locked position, wherein at least one of the pocket of the pocket plate or the teeter-totter strut being configured so that when a shock load force acts on the teeter-totter strut, the teeter-totter strut is prevented from moving into the engaged position;
while the rotary stage is rotating, the teeter-totter strut is in an unlocked position and after the rotary stage ceases rotating, the teeter-totter strut moves into the locked position to prevent the rotary stage from back driving,
a first pivot point acting on a first face of the teeter-totter strut; and
a second pivot point acting on a second face of the teeter-totter strut,
wherein the teeter-totter strut is configured so that, when the shock load force acts on the second face of the teeter-totter strut, the teeter-totter strut is forced about the first pivot point into the disengaged position or wherein the teeter-totter strut is configured so that, when the shock load force acts on the first face of the teeter-totter strut, the teeter-totter strut is forced about the second pivot point into the disengaged position.

14. A torque locking mechanism for preventing back driving of a rotary stage including a notch plate configured for rotation about a rotational axis, the torque lock mechanism comprising:
- a pocket plate having a pocket receiving a teeter-totter strut;
- an electromechanical component having an actuator;
- a coupling face of the notch plate oriented to face axially along the rotational axis and having a set of locking formations angularly spaced about the rotational axis, each of the locking formations defining a load bearing surface adapted for abutting engagement with a load bearing surface of the teeter-totter strut;
- wherein the teeter-totter strut is moveable towards the coupling face to a locked position in response to the actuator acting on the teeter-totter strut, the teeter-totter strut abuttingly engaging one of the locking formations to prevent rotation of the notch plate in one direction about the rotational axis in the locked position, wherein at least one of the pocket of the pocket plate or the teeter-totter strut being configured so that when a shock load force acts on the teeter-totter strut, the teeter-totter strut is prevented from moving into the engaged position;
- while the rotary stage is rotating, the teeter-totter strut is in an unlocked position and after the rotary stage ceases rotating, the teeter-totter strut moves into the locked position to prevent the rotary stage from back driving; and
- a return spring that is retained in a spring pocket and that provides a biasing force between the spring pocket and a second face of the teeter-totter strut, and wherein a center of mass of the teeter-totter strut is between a point at which the return spring contacts the second face of the teeter-totter strut and a first pivot point.

15. A clutch assembly comprising:
- a pocket plate having a pocket;
- a teeter-totter strut retained in the pocket, the teeter-totter strut being pivotable to an engaged position in which and engagement face of the teeter-totter strut extends out from the pocket, the teeter-totter strut being pivotable from the engaged position to a disengaged position in which the engagement face of the teeter-totter strut extends within the pocket; and
- wherein the clutch assembly is configured so that when a shock load force acts on the teeter-totter strut, the teeter-totter strut is prevented from moving into the engaged position,
  - wherein the teeter-totter strut has a first shock load pivot for shock loads along a first direction and a second shock load pivot for shock loads along a second direction, and wherein the teeter-totter strut also has a center of mass located between the first and second shock load pivots.

16. A clutch assembly comprising:
- a pocket plate having a pocket;
- a teeter-totter strut retained in the pocket, the teeter-totter strut being pivotable to an engaged position in which and engagement face of the teeter-totter strut extends out from the pocket, the teeter-totter strut being pivotable from the engaged position to a disengaged position in which the engagement face of the teeter-totter strut extends within the pocket;
- wherein the clutch assembly is configured so that when a shock load force acts on the teeter-totter strut, the teeter-totter strut is prevented from moving into the engaged position;
- a return spring between the pocket plate and the teeter-totter strut and carried in the pocket of the pocket plate to engage a face of the teeter-totter strut; and
- an electromechanical actuator having a pin extendible through the pocket plate into the pocket and having a free end abutting the face of the strut.

* * * * *